US008958746B2

(12) United States Patent
Renard et al.

(10) Patent No.: US 8,958,746 B2
(45) Date of Patent: Feb. 17, 2015

(54) MOBILE INTEGRATED DISTRIBUTION AND TRANSACTION SYSTEM AND METHOD FOR NFC SERVICES, AND A MOBILE ELECTRONIC DEVICE THEREOF

(71) Applicant: Toro Development Limited, Hong Kong (HK)

(72) Inventors: Laurent Renard, Hong Kong (HK); Gregory Puente-Castan, Hong Kong (HK)

(73) Assignee: Toro Development Ltd., Admiralty (HK)

( * ) Notice: Subject to any disclaimer, the term of this patent is extended or adjusted under 35 U.S.C. 154(b) by 0 days.

(21) Appl. No.: 13/934,726

(22) Filed: Jul. 3, 2013

(65) Prior Publication Data
US 2013/0295847 A1 Nov. 7, 2013

Related U.S. Application Data

(63) Continuation-in-part of application No. 12/965,597, filed on Dec. 10, 2010, now Pat. No. 8,532,572.

(30) Foreign Application Priority Data

Dec. 11, 2009 (TW) .............................. 98142439 A

(51) Int. Cl.
*H04B 5/00* (2006.01)
*G06Q 20/32* (2012.01)
(Continued)

(52) U.S. Cl.
CPC .............. *H04B 5/0056* (2013.01); *G06Q 20/32* (2013.01); *G06Q 20/3227* (2013.01); *G06Q 20/327* (2013.01); *G06Q 20/38215* (2013.01); *G06Q 30/06* (2013.01); *G06Q 40/02* (2013.01);
(Continued)

(58) Field of Classification Search
USPC .......... 455/41.1, 41.2, 410, 411; 709/223, 229
See application file for complete search history.

(56) References Cited

U.S. PATENT DOCUMENTS 8,108,318 B2 1/2012 Mardikar
2007/0083378 A1* 4/2007 Guarraci et al. .................. 705/1
(Continued)

FOREIGN PATENT DOCUMENTS

CN 101359383 2/2009
CN 101562802 10/2009
(Continued)

OTHER PUBLICATIONS

Balaban, Dan; "Isis to Change Wallet Design; Hires New Wallet App Developer," NFC Times; published Feb. 21, 2013 (7 pages).

*Primary Examiner* — Tuan H Nguyen
(74) *Attorney, Agent, or Firm* — Leason Ellis LLP

(57) ABSTRACT

A mobile integrated distribution and transaction system and method for NFC services are described. The system comprises a server for creating a widget having a lifecycle and a certificate, distributing the widget, and retrieving the widget information used on NFC transactions; and at least one mobile electronic device having a transaction terminal comprising a NFC modem and at least one secure element for storing a plurality of secure applications, and a virtual machine for managing the widget and changing the widget information during the valid lifecycle while the NFC modem is enabling the NFC transactions with the secure element under a specific secure application.

22 Claims, 8 Drawing Sheets

(51) Int. Cl.
*G06Q 20/38* (2012.01)
*G06Q 30/06* (2012.01)
*G06Q 40/02* (2012.01)
*H04L 29/06* (2006.01)
*H04W 12/06* (2009.01)

(52) U.S. Cl.
CPC .......... *H04B5/0031* (2013.01); *H04L 63/0823* (2013.01); *H04W 12/06* (2013.01)
USPC .......... 455/41.1; 455/410; 455/411; 709/223; 709/229

(56) References Cited

U.S. PATENT DOCUMENTS

2009/0248883 A1* 10/2009 Suryanarayana et al. .... 709/229
2013/0339232 A1    12/2013 Desai at al.

FOREIGN PATENT DOCUMENTS

CN           101657984       2/2010
WO      WO 2009/063121       5/2009

* cited by examiner

US 8,958,746 B2

MOBILE INTEGRATED DISTRIBUTION AND TRANSACTION SYSTEM AND METHOD FOR NFC SERVICES, AND A MOBILE ELECTRONIC DEVICE THEREOF

CROSS-REFERENCE TO RELATED APPLICATIONS

This non-provisional application is a continuation-in-part of U.S. patent application Ser. No. 12/965,597, filed Dec. 10, 2010, which claims priority under 35 U.S.C. §119(a) to Patent Application No(s). 098142439 filed in Taiwan, R.O.C. on Dec. 11, 2009, which are hereby incorporated by reference in their respective entireties.

FIELD OF THE INVENTION

The present invention relates to an integrated distribution and transaction system and method, and more particularly, to a mobile integrated distribution and transaction system and method for NFC (Near-Field Communication) services, and a mobile electronic device thereof.

DESCRIPTION OF THE PRIOR ART

Near Field Communication (WC) is a new, short-range wireless connectivity technology that evolved from a combination of existing contactless identification and interconnection technologies. Products with built-in NFC will dramatically simplify the way consumer devices interact with one another, helping people speed connections, receive and share information and even make fast and secure payments.

Operating at 13.56 MHz and transferring data at up to 424 Kbits/second, NFC provides intuitive, simple, and safe communication between electronic devices. NFC is both a "read" and "write" technology. Communication between two NFC-compatible devices occurs when they are brought within four centimeters of one another: a simple wave or touch can establish an NFC connection, which is then compatible with other known wireless technologies such as Bluetooth or Wi-Fi. The underlying layers of NFC technology follow universally implemented ISO, ECMA, and ETSI standards. Because the transmission range is so short, NFC-enabled transactions are inherently secure. Also, physical proximity of the device to the reader gives users the reassurance of being in control of the process.

NFC can be used with a variety of devices, from mobile phones that enable payment or transfer information, to digital cameras that send their photos to a TV set with just a touch. The possibilities are endless, and NFC is sure to take the complexities out of today's increasingly sophisticated consumer devices and make them simpler to use.

SUMMARY OF THE INVENTION

One object of the present invention is to provide a mobile integrated distribution and transaction system and method particularly for use on information processing of NFC services.

Another object of the present invention is to provide a mobile distribution system and method to distribute the widgets used for NFC transactions.

Yet another object of the present invention is to provide a mobile transaction system and method to use the widgets in NFC transactions.

Still another object of the present invention is to provide a mobile electronic device to use the widgets in NFC transactions.

The aforementioned objects can be achieved singularly or in combination when providing the invention defined by the claims appended hereto as summarized below.

In order to achieve the aforementioned objects, the present invention provides a mobile integrated distribution and transaction system comprising: a server having a widget generator for creating a widget having a certificate; a communication interface for distributing the widget and retrieving the widget information associated with NFC transactions; and at least one mobile electronic device having a transaction terminal comprising an NFC modem and at least one secure element divided into a plurality of secure domains, and a virtual machine for managing the widget and changing the widget information while the NFC modem is enabling the NFC transactions with the secure element.

In order to achieve the aforementioned objects, the present invention provides a mobile distribution system comprising: a widget generator for creating a widget having a certificate; and a communication interface for distributing the widget to a mobile electronic device with a transaction terminal having at least one secure element for storing a plurality of secure applications, and retrieving the widget information from the mobile electronic device using the transaction terminal for NFC transactions.

In order to achieve the aforementioned objects, the present invention provides a mobile distribution method, comprising the following steps: generating a widget having a certificate; distributing the widget to a mobile electronic device with a transaction terminal having at least one secure element for storing at least one secure application; and retrieving the widget information from the mobile electronic device on NFC transactions enabled by one of the secure element in use of the transaction terminal.

In order to achieve the aforementioned objects, the present invention provides a mobile transaction system to use a widget on wireless transactions, comprising: means for receiving widgets, each widget having a certificate displays multimedia content associated with a secure application; a graphical user interface for displaying the widgets; means for selecting one of the widgets on the graphical user interface; and means for transmitting the widget information while enabling the wireless transactions with a secure element.

In order to achieve the aforementioned objects, the present invention provides a mobile transaction method to use a widget on NFC transactions, comprising: receiving widgets, where each widget has a certificate; displaying the widgets on a graphical user interface; selecting one of the widgets on the graphical user interface; and changing the widget information while an NFC modem is enabling the NFC transactions with a secure element.

The aforementioned method can be implemented by a software installed on a mobile electronic device comprising the NFC modem and the graphical user interface.

The aforementioned method can be executed by computer-executable instructions stored in a computer-readable media.

In order to achieve the aforementioned objects, the present invention provides a mobile electronic device for NFC services, comprising: a transaction terminal having an NFC modem for transmitting radio frequency (RF) signals associated with a contactless data of NFC transactions, and at least one secure element for storing at least one secure application; and a virtual machine for authenticating and managing a plurality of widgets, each widget having a certificate, and changing the widget information while the NFC modem is enabling the NFC transactions with the secure element.

The aforementioned mobile electronic device can be a PDA or an iPod or a cell phone or a hand-held device or a multimedia player.

In order to achieve the aforementioned objects, the present invention provides a mobile electronic device for NFC services, composed of: a wireless modem for receiving a widget with a certificate from a wireless network; at least one secure element for storing at least one secure application; an NFC modem for transmitting radio frequency (RF) signals associated with a contactless data of NFC transactions; a graphical user interface for displaying the widget; a memory for storing the widget; and a processor performing a virtual machine for managing the widget(s) and changing the widget(s') information while the NFC modem is enabling the NFC transactions with the secure element.

In the mobile integrated distribution and transaction system and method, the mobile distribution system and method, the mobile transaction system and method, and the mobile electronic device thereof according to the present invention, associated information of various transaction applications can be displayed on a mobile electronic device through widgets having a certificate, NFC transactions can be enabled by a secure element for storing a secure application, and information associated with a secure application can be received or processed by the widgets.

According to another broad aspect of the invention, a mobile distribution system, installed on a mobile electronic device, includes a processor, memory, and code in the memory for implementing a particular mobile operating system in the processor, and being operatively coupled to a secure element having one or more secure applications. The system further includes a virtual machine configured to execute in the processor to provide a runtime environment capable of running a plurality of widgets and configured to enable the widgets to be operable on any of a plurality of mobile operating systems including the particular mobile operating system. The system further includes a secure element manager configured to enable the widgets to read from or write to the secure element by providing the widgets with access to a corresponding secure applications stored in the secure element, and enabling the mobile electronic device to perform NFC transactions using the corresponding secure applications.

In yet further embodiments, the secure element manager can be configured to create an instance of a configured driver enabling access to the secure element in response to a request by a widget to access the secure element, with the secure element manager being configured to provide access to a plurality of secure elements.

In a more particular aspect, the system can further include a content handler configured to provide one or more of the following: communication between a third-party application installed on the mobile electronic device and the widgets; and communication between the third-party application installed on the mobile electronic device and the corresponding secure applications stored in the secure element. The system can further comprise a content handler plug-in, the content handler plug-in being implemented in the third-party application and enabling the third-party application to operatively communicate with the content handler. The content-handler plug-in can further comprise a unified reference locator (URL) of the content handler for connection to the content handler, and widget identifiers associated with specific widgets, wherein the widget identifier can be presented to the content handler via the URL to enable access by the third-party application to the widget.

In still a further aspect of the invention, the virtual machine can be configured to perform one or more of the following: initiate a download of a widget from a widget distribution interface over a wireless network when the a widget identifier associated with the widget is presented to the content handler by the third-party application, but the at least one widget is not presently installed on the mobile electronic device; and initiate a download of the third-party application from a third-party application distribution interface over the wireless network when the widget attempts to communicate with the third-party application, but the third-party application is not presently installed on the mobile electronic device.

In still yet further embodiments, the system includes: an extensions manager configured using code executed in the processor to provide communication between the virtual machine and/or the secure element manager, and a plurality of extensions associated with the plurality of mobile operating systems. Each of the widgets in this embodiment can be configured to be operable in the runtime environment using code executing in the processor, without necessitating configuration directly with the plurality of mobile operating systems, and each of the widgets can be added, removed, or updated without necessitating alteration of the runtime environment.

According to yet another broad aspect of the invention, a method of providing a mobile distribution system, for use on a mobile electronic device having a particular mobile operating system, a processor, memory, and code in the memory for implementing a particular mobile operating system in the processor, and being operatively coupled to a secure element having one or more secure applications is provided. A server uses code to generate a mobile client for distribution over a wireless network to the mobile electronic device, the mobile client including at least the following: a virtual machine configured to execute in the processor to provide a runtime environment capable of running a plurality of widgets and configured to enable the widgets to be operable on any of a plurality of mobile operating systems including the particular mobile operating system. A secure element manager is configured to enable at least one widget of the plurality of widgets to read from or write to the secure element by providing the at least one widget with access to a corresponding one of the one or more secure applications stored in the secure element, and by enabling the mobile electronic device to perform at least one NFC transaction using the corresponding secure applications.

In accordance with one or more of the foregoing methods, the secure element manager can be configured to create an instance of a configured driver enabling accessing to the secure element in response to a request by the widget to access the secure element. As well, the secure element manager can be configured to provide access to a plurality of secure elements. The mobile client can then be distributed to the mobile electronic device.

These and other aspects, features and advantages will be understood with reference to the following description of certain embodiments of the invention.

DETAILED DESCRIPTION OF THE PREFERRED EMBODIMENTS

Figure 1:
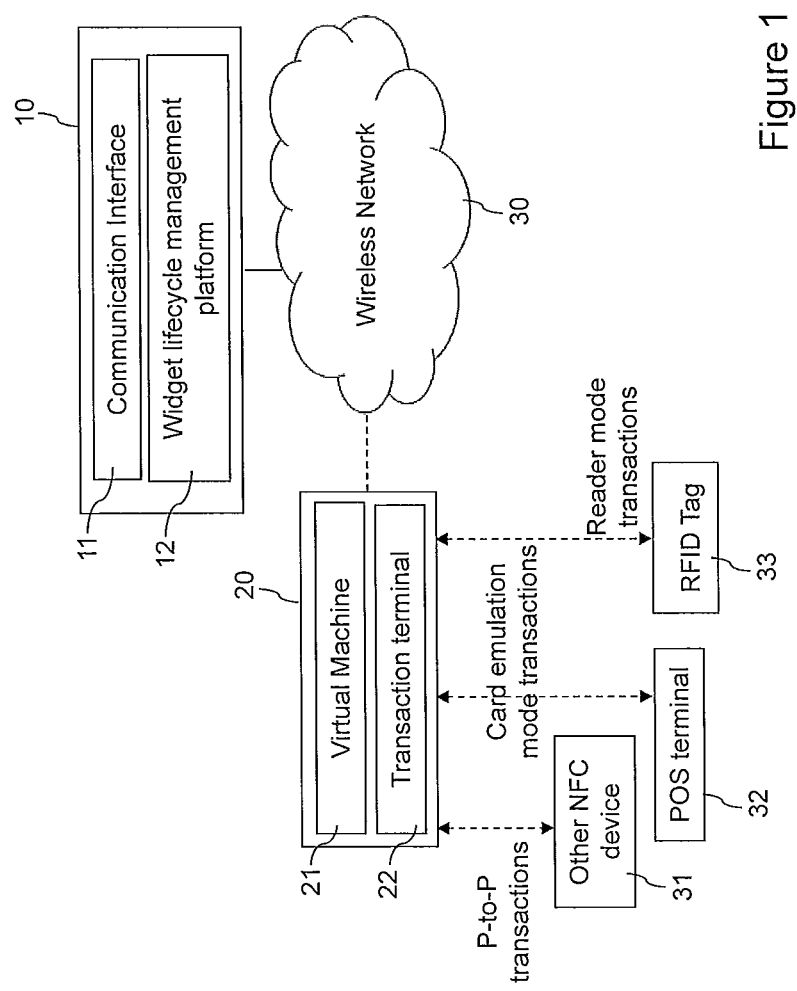
FIG. 1 shows a system architecture diagram of a mobile integrated distribution and transaction system for NFC service in accordance with the present invention.

FIG. 1 shows a system architecture diagram of a mobile integrated distribution and transaction system for NFC service in accordance with the present invention. The mobile integrated distribution and transaction system for NFC service of the present invention comprises a server 10 comprising a communication interface 11 communicated with a wireless network 30 and executes a widget lifecycle management platform 12. The widget lifecycle management platform 12 comprises a widget generator for creating a widget. The widget may display multimedia content associated with a secure application. In an embodiment of the present invention, the widget generator is a software development kit (SDK) of the widget lifecycle management platform 12, and the widget is an independent application that is developed using SDK and that can only be run on a virtual machine 21 of a mobile electronic device 20.

In an embodiment of the present invention, the widget is assigned a certificate which allows the widget to enable a NFC transaction with a secure element for storing a plurality of secure applications. In an embodiment, the widget is assigned a lifecycle, and the widget lifecycle management platform 12 retrieves the widget information used on the NFC transaction through the communication interface 11 during the valid lifecycle. In an embodiment of the present invention, the widget is assigned an identification number representing an account for conducting the NFC transactions under a secure application. In each embodiment of the present invention, the secure application is, but not limited to, a transport application or a credit/debit application or a coupon application or a secure access application or a loyalty card application or an electronic purse application or a ticketing application.

The widget lifecycle management platform 12 of the mobile integrated and transaction system of the present invention uses the communication interface 11 to distribute a plurality of widgets to at least one mobile electronic device 20 through the wireless network 30. In an embodiment of the present invention, the widget lifecycle management platform 12 also uses the communication interface 11 to retrieve the widget information used on the NFC transaction from the mobile electronic device 20 so as to analyze the information associated with NFC transactions received by the widget.

Still referring to FIG. 1, the mobile integrated distribution and transaction system of the present invention comprises at least one mobile electronic device 20 comprising a virtual machine 21 and a transaction terminal 22. The virtual machine 21 is an implementation of software and provides a widget management platform for managing the widget received by the mobile electronic device 20 from the server 10. In an embodiment of the present invention, the transaction terminal 22 allows the mobile electronic device 20 to enable a peer-to-peer transaction with other NFC devices 31, so that the mobile electronic device 20 changes the widget information or that the widget receives the information associated with transactions. In another embodiment of the present invention, the transaction terminal 22 allows the mobile electronic device 20 to enable a card emulation mode transaction with a point-of-sales (POS) terminal 32, so that the mobile electronic device 20 changes the widget information or that the widget receives the information associated with transactions. In yet another embodiment of the present invention, the transaction terminal 22 allows the mobile electronic device 20 to enable a reader mode transaction with a radio-frequency identification (RFID) tag 33, so that the mobile electronic device 20 changes the widget information or that the widget receives the information associated with transactions. In other words, an NFC transaction enabled by the mobile electronic device 20 includes, but is not limited to, a peer-to-peer transaction, a card emulation mode transaction, and a reader mode transaction.

Figure 2:
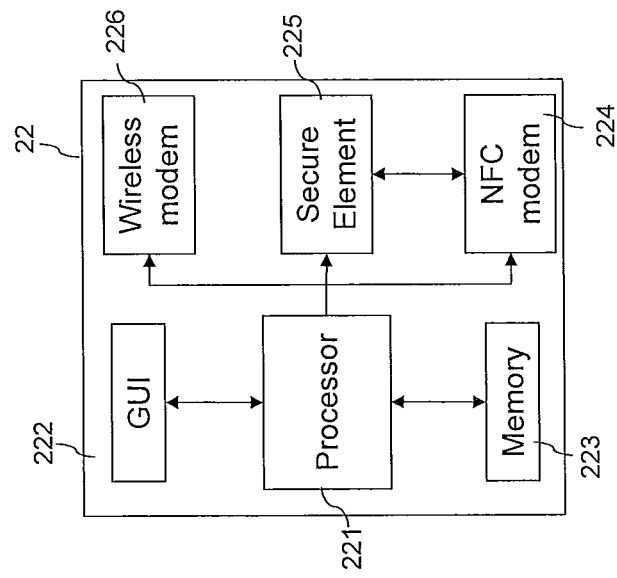
FIG. 2 shows a block diagram of a transaction terminal in accordance with the present invention.

In an embodiment of the present invention, a mobile electronic device 20 for NFC services comprises a transaction terminal 22 as shown in FIG. 2 and a virtual machine 21. The transaction terminal 22 comprises: an NFC modem for transmitting radio frequency (RF) signals associated with contactless data of NFC transactions or for transmitting data associated with NFC transactions; and at least one secure element divided into at least one secure domain where a specific secure application is located or stored. In an embodiment of the present invention, the secure element is implemented by a SIM card for a cell phone or a secure memory card, such as a micro-SD card. The virtual machine 21 is installed on the mobile electronic device 20 for authenticating and managing a plurality of widgets, and each widget has a certificate. After the certificate is authenticated by the virtual machine 21, the virtual machine 21 allows the widget to access the secure element 225. The widget changes the widget information or retrieves information under a corresponding secure application stored in one of secure domains while the NFC modem is enabling the NFC transactions with the secure element 225.

FIG. 2 shows a block diagram of a transaction terminal in accordance with the present invention. The transaction terminal 22 is implemented on a mobile electronic device 20. In an embodiment of the present invention, the mobile electronic device 20 is a PDA or an iPod or a cell phone or a hand-held device or a multimedia player. In another embodiment of the present invention, the mobile electronic device 20 comprises the transaction terminal 22 only, exclusively used for conducting NFC transactions under the control of a secure application located or stored in a secure domain.

In an embodiment of the present invention, a mobile electronic device 20 comprises a transaction terminal 22. The transaction terminal 22 is used for NFC transactions, composed of a wireless modem 226, at least one secure element 225, an NFC modem 224, a memory 223, a graphical user interface 222, and a processor 221. The wireless modem 226 can use a wireless protocol such as 3G, GPRS, Bluetooth, or WiFi or any other wireless communication protocol such that the mobile electronic device 20 communicates with a wireless network 30, and the widget is distributed to the mobile electronic device 20 through the wireless modem 226 of the transaction terminal 22. The secure element 225 is a hardware embedded into the mobile electronic device 20 and is divided in a plurality of secure domains where secure applications are located or stored. In an embodiment of the present invention, the mobile electronic device 20 is a cell phone, and the secure element 225 is the SIM card for a cell phone or a secure memory card which can be plugged into the memory card slot of the mobile electronic device 20. For example, such secure memory card is a micro-SD card. In another embodiment of the present invention, the mobile electronic device 20 may comprises a plurality of secure elements 225. For example, both a SIM card and a memory card are embedded into a NFC mobile phone. The SIM card and the memory card are divided into a plurality of secure domains for storing a plurality of secure applications, respectively.

In some embodiments, secure element 225 can be operatively connected to the mobile electronic device 20 as described above. In some embodiments, secure element 225 can be operatively connected to the mobile electronic device 20 without being embedded or plugged into the mobile electronic device 20. For example, the secure element 225 may be wirelessly connected to the mobile electronic device 20 via any appropriate wireless communication means (e.g., Bluetooth, WiFi, RF, etc.) Once the secure element 225 is operatively connected to the mobile electronic device 20 using any of the above means, NFC transactions can be conducted under the control of a secure application located or stored in a secure domain of the secure element 225.

The NFC modem 224 comprises a built-in NFC antenna (not shown) for NFC transactions and is electronically connected to the secure element 225. The processor 221 of the transaction terminal 22 executes software program instructions of a widget management platform, and is electrically connected to the wireless modem 226 to receive the widgets distributed by the server 10 or to transmit information associated with NFC transactions received by the widget back to the server 10. The widget is assigned an identification number representing an account for conducting NFC transactions under the control of a secure application stored in the secure element, and the information transmitted back to the server 10 from the widget includes the identification number.

In addition, the processor 221 electronically connects to the secure element 225 and the NFC modem 224 to access the secure element 225 for enabling the NFC transactions. The processor 221 also electronically connects to the memory 223 for storing the received widget and connects to the graphical user interface 222 for displaying multimedia content associated with a secure application represented by the widget.

In an embodiment of the present invention, the widget assigned a certificate is corresponding to a specific secure application stored in a secure domain. The certificate will be authenticated by the widget management platform provided by the virtual machine 21. If the certificate passes the authentication, the virtual machine 21 will allow the widget to access the secure element 225 to enable the NFC modem 224 to conduct the NFC transactions under a secure application, so that the widget information is changed or that the transaction information associated with a secure application is received by the widget. A secure application is located or stored in a secure domain. For example, a loyalty card application is located in a secure domain which enables a loyalty card transaction with the secure element 225. For another example, an electronic purse application is located in a secure domain which enables an electronic purse transaction with the secure element 225. For another example, a coupon application is located in a secure domain which enables a coupon transaction with the secure element 225.

In an embodiment of the present invention, the widget is assigned a certificate and a lifecycle. During the valid lifecycle, if the certificate passes the authentication of the virtual machine 21, it will allow the widget to access the secure element 225 to enable the NFC modem 224 to conduct the NFC transactions. The widget also transmits information associated with the NFC transaction back to the server 10 through the wireless modem 226 during the valid lifecycle. In an exemplary embodiment, the widget displays multimedia content associated with a coupon application and is assigned a lifecycle associated with the coupon. The widget is distributed to the mobile electronic device 20, which uses the coupon information of the widget through NFC transactions under the coupon application during the valid lifecycle of the coupon.

Figure 3B:
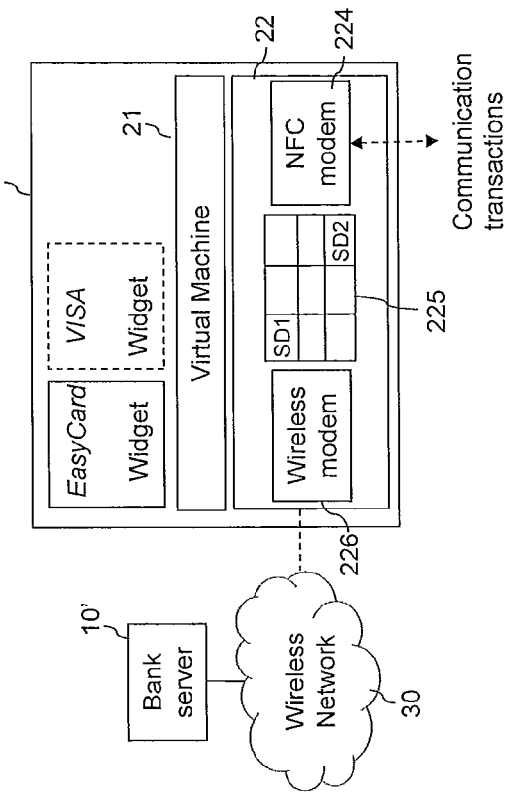
FIG. 3B shows a schematic block diagram illustrating the mobile electronic device of the FIG. 3A communicating with the bank server for receiving widgets and enabling a transaction communication.
Figure 3A:
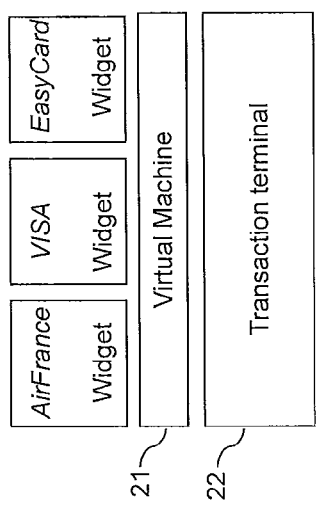
FIG. 3A shows a schematic block diagram illustrating the software and the hardware of the mobile electronic device.

FIG. 3A shows a schematic block diagram illustrating the software and the hardware of the mobile electronic device. In the mobile electronic device of the present invention, the virtual machine 21 manages the widget received by the mobile electronic device 20 from the server 10, and authenticates the certificate of the widget to allow the widget to communicate with the transaction terminal 22. Each widget displays multimedia content associated with a secure application; for example, it may be a widget associated with AirFrance, VISA, or EasyCard applications. In the embodiments of the present invention, the virtual machine 21 may be installed on various mobile electronic devices 20 (such as a PDA, an iPod, a mobile phone, a handheld device, or a multimedia player) and provides a widget management platform such that the authenticated widget accesses the secure element 225 of the transaction terminal 22 to enable NFC transactions.

Figure 4:
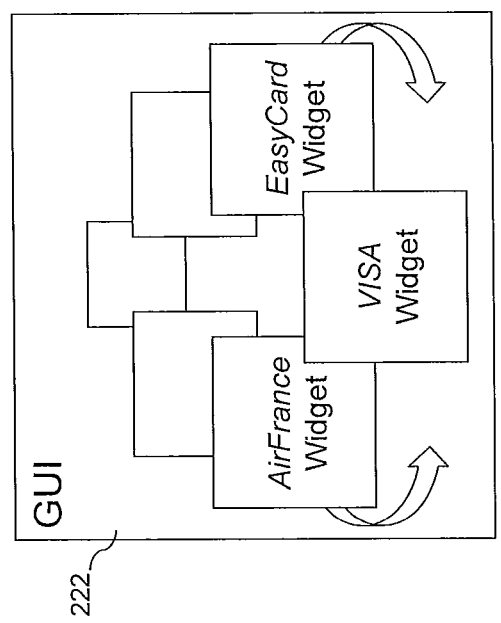
FIG. 4 shows a schematic diagram illustrating a plurality of applied widgets displayed on the graphical user interface of the mobile electronic device in accordance with the present invention.

FIG. 4 shows a schematic diagram illustrating a plurality of applied widgets displayed on the graphical user interface of the mobile electronic device in accordance with the present invention. In an embodiment of the present invention, the widgets managed by the virtual machine 21 may be displayed by the graphical user interface 222 of the transaction terminal 22, and it is preferable that the graphical user interface 222 is implemented by a touch panel. The user may move the finger on the touch panel in the arrow direction shown in FIG. 4 to select one of the widgets, such as the widget associated with a VISA application stored in a secure element, and then move the selected widget to the up front position. When the user uses the finger to click on the up front widget on the touch panel, it means that the user decides to use that selected widget to enable NFC transactions.

Once the user selects a widget, the virtual machine 21 will allow the widget to access the secure element 225 of the transaction terminal 22 to activate the NFC modem 224. The selected widget then waits for an event triggered by the NFC modem 224 so that the widget information changes or that the widget receives transaction information associated with the VISA secure application, wherein the event is an interaction associated with the NFC transaction, as shown in FIG. 4.

FIG. 3B shows a schematic block diagram illustrating the mobile electronic device of the FIG. 3A communicating with the bank server for receiving widgets and enabling a transaction communication. In an embodiment of the present invention, a secure element 225 of the mobile electronic device 20 is provided by a bank, such as a secure micro-SD card which can be plugged into the micro-SD card slot of the mobile electronic device 20. The memory space of micro-SD card may be divided in a plurality of secure domains such as SD1, SD2 as shown in FIG. 3B. One secure application is located or stored in one secure domain; for example, a VISA secure application is located in a secure domain which enables VISA secure transactions using the secure element 225. The secure application is, but not limited to, a transport application or a credit/debit application or a coupon application or a secure access application or a loyalty card application or an electronic purse application or a ticketing application.

A bank server 10' issues a secure application downloaded and stored into one secure domain of the secure element 225, and issues widgets promoted by the bank. Each widget is assigned a certificate and the certificate allows the widget to be authenticated by the virtual machine 21 to access the secure element 225 such that the widget received by the mobile electronic device 20 from the bank server 10' can enable NFC transactions under a corresponding secure application located in the secure domain of the secure element 225.

Figure 5:
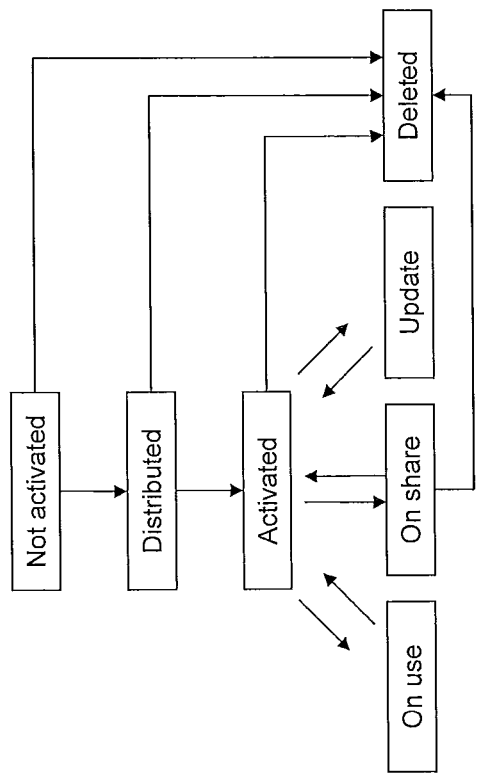
FIG. 5 shows a schematic block diagram illustrating the various states of a widget in accordance with the present invention.

FIG. 5 shows a schematic block diagram illustrating the various states of a widget in accordance with the present invention. The widget used in the mobile integrated distribution and transaction system of the present invention has a plurality of states. The initial state of the widget is "not activated" when the widget is created on the server. The state of the widget will change to "deleted" if the widget is assigned a lifecycle but the state of the widget remains as "not activated" after the valid lifecycle is past. The mobile electronic device 20 requests the server 10 for downloading a widget. The state of the widget is "distributed" when the widget is being distributed to the virtual machine 21 of the mobile electronic device 20 before the widget is activated successfully. The state of the widget will change from "distributed" to "activated" when the widget is authenticated by the virtual machine 21 and then successfully accesses the corresponding secure application stored in the secure elements 225.

The virtual machine 21 allows the widget to access the secure element 225 of the transaction terminal 22 to activate the NFC modem 224 when the user selects a widget on the graphical user interface 222. The widget then reacts to an event triggered by the NFC modem 224 such that the state of the widget changes from "activated" to "in use" under a specific secure application corresponding to the widget, and the event is an interaction associated with NFC transactions. The state of the widget will return from "in use" to "activated" after the widget completes processing the information on NFC transactions.

In an embodiment of the present invention, the widget, such as a widget associated with a coupon application, will change its state from "in use" to "deleted" after the widget completes processing the information on NFC transactions. In another embodiment of the present invention, when an error occurs while the widget is processing the information on NFC transactions, such as a date conflict error or a secure application conflict error on NFC transactions, then the state of the widget will change from "in use" to "error" and the graphical user interface 222 will display the error information. The state of the widget will return from "error" to "activated" after the error is resolved.

In an embodiment of the present invention, the widget can transfer messages between two virtual machines of separate mobile electronic devices. The virtual machine 21 will allow the widget to access the secure element 225 of the transaction terminal 22 to activate the NFC modem 224 when the user chooses to share a widget on the graphical user interface 222. The widget then reacts to an event triggered by the NFC modem 224 such that the state of the widget changes from "activated" to "on share" under a specific secure application corresponding to the widget, and the event is an interaction associated with NFC transactions. The state of the widget will return from "on share" to "activated" after the widget completes processing the information on NFC transactions.

In an embodiment of the present invention, the virtual machine 21 will allow the widget to access the secure element 225 of the transaction terminal 22 to activate the NFC modem 224 when the user chooses to update a widget on the graphical user interface 222. The widget then reacts to an event triggered by the NFC modem 224 such that the state of the widget changes from "activated" to "updated" under a specific secure application corresponding to the widget, and the event is an interaction associated with NFC transactions. The state of the widget will return from "on share" to "updated" after the widget updates the information on NFC transactions.

Figure 6:
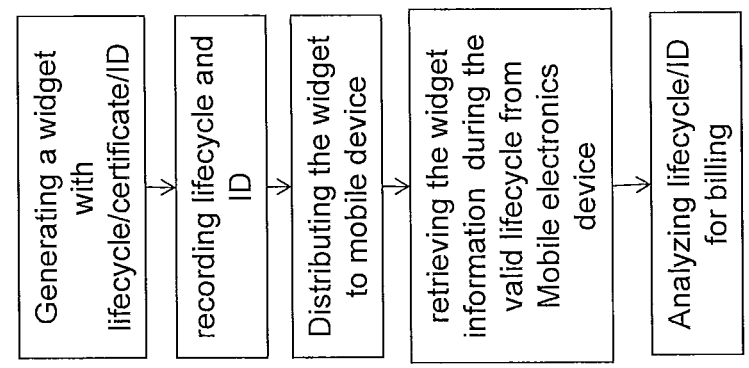
FIG. 6 is a flow chart showing a mobile distribution method in accordance with the present invention.

FIG. 6 is a flow chart showing a mobile distribution method in accordance with the present invention. In an embodiment of the invention, the mobile distribution system implements a mobile distribution method, the method comprising the following steps: creating a widget displaying multimedia content associated with a secure application such as a transport application or a credit/debit application or a coupon application or a secure access application or a loyalty card application or an electronic purse application or a ticketing application. The widget only executes on a virtual machine 20 of the mobile electronic device 20 or installed on the mobile electronic device 20.

In the mobile distribution method, the step of creating a widget further comprises: initializing a state of the widget as "not activated" when the widget is created; assigning a certificate to the widget, wherein the widget is associated with a specific secure application such as a transport application or a credit/debit application, and the certificate allows the widget authenticated by the virtual machine 21 to access the secure element 225 embedded or plugged into the transaction terminal 22 to enable NFC transactions to retrieve information under a specific secure application; assigning a lifecycle to the widget, wherein the widget downloaded to the mobile electronic device 20 may process or retrieve information on NFC transactions during the valid lifecycle and transmit information back to the server 10; and assigning an identification number representing an account for conducting NFC transactions under the control of a secure application corresponding to the widget. In addition, the method comprises the following step: recording the certificate, lifecycle and the identification number assigned to the widget to gather statistics for the mobile distribution system or to analyze the widget.

In an embodiment of the present invention, the mobile distribution system further comprises the following steps: distributing the widget to the mobile electronic device 20 and changing the state of the widget from "not activated" to "distributed", wherein the mobile electronic device 20 has a transaction terminal 22 comprising at least one secure element 225 for storing a secure application and a virtual machine 21; and retrieving the widget information from the mobile electronic device 20 while the state of the widget is "activated", wherein the widget information is gathered or updated by the widget while the mobile electronic device 20 enables NFC transactions. In another embodiment of the present invention, the mobile distribution method further comprises the following step: analyzing the information gathered or updated by the widget for transaction accounting according to the recorded lifecycle and identification number.

Figure 7:
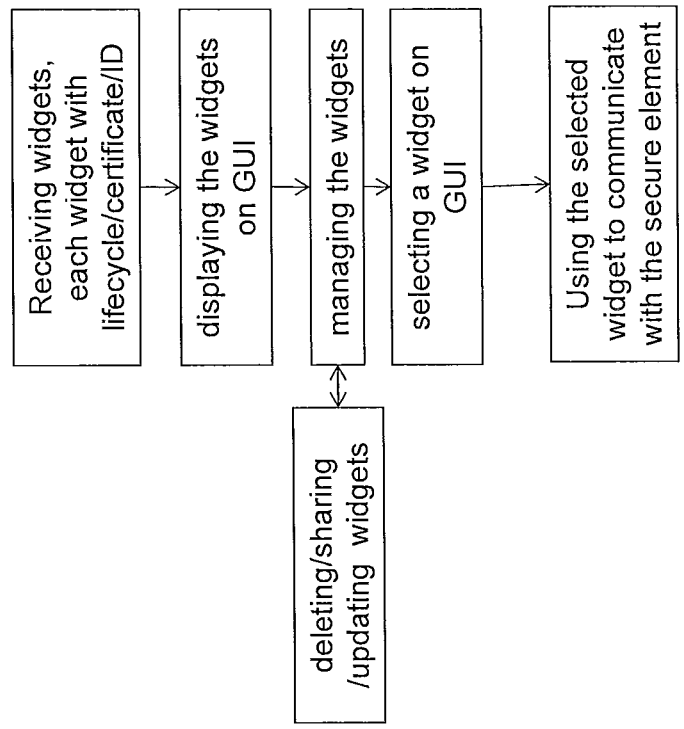
FIG. 7 is a flow chart showing a mobile transaction method in accordance with the present invention.

FIG. 7 is a flow chart showing a mobile transaction method in accordance with the present invention. In an embodiment of the present invention, the mobile transaction method is implemented by the mobile transaction system of the present invention or by the mobile electronic device 20 as shown in FIG. 1, wherein the mobile electronic device comprises the transaction terminal 22 as shown in FIG. 2. The mobile transaction method is implemented by a software installed on the mobile electronic device 20 comprising the NFC modem and the graphical user interface 222. The mobile transaction method comprises the following steps: receiving the widgets distributed by the server 10, each widget having a certificate, and/or a lifecycle and a identification number, wherein the certificate allows the widget authenticated by the virtual machine 21 to access the secure element 225 embedded or plugged into the transaction terminal 22 to enable NFC transactions, wherein the identification number represents an account for conducting NFC transactions under a secure application, and wherein the widget information is changed while the NFC modem is enabling the NFC transactions during the valid life cycle; and authenticating the certificate of the widget to determine whether the widget can access the secure element 225 of the transaction terminal 22, wherein the widget is activated if the widget successfully accesses the secure element 225 to retrieve information from a specific secure application stored in the secure element, and the state of the widget changes from "distributed" to "activated".

The mobile transaction method further comprises: displaying the widgets on the graphical user interface 222, wherein the widgets displays multimedia content associated with a secure application; managing the widgets; selecting one of the widgets on the graphical user interface 222 to use, share or update such that the selected widget reacts to an event, which is an interaction associated with NFC transactions, triggered by the NFC modem 224 and changing the state of the widget to "in use", "on share" or "updated"; Using the selected widget to communicate with the secure element; changing or transmitting the widget information while the NFC modem 224 is enabling NFC transactions with the secure element 225; and changing the state of the widget back to "activated" after the widget is used, shared or updates the received information on NFC transactions.

In an embodiment of the present invention, the method further comprises: the widget retrieving information associated with the NFC transaction from the NFC modem, or a secure application corresponding to the widget; and transferring the widget or widget information on to the mobile electronic device 20 having an NFC modem through the NEC transaction, or through a combination of the NFC transaction and a communication means.

Figure 8:
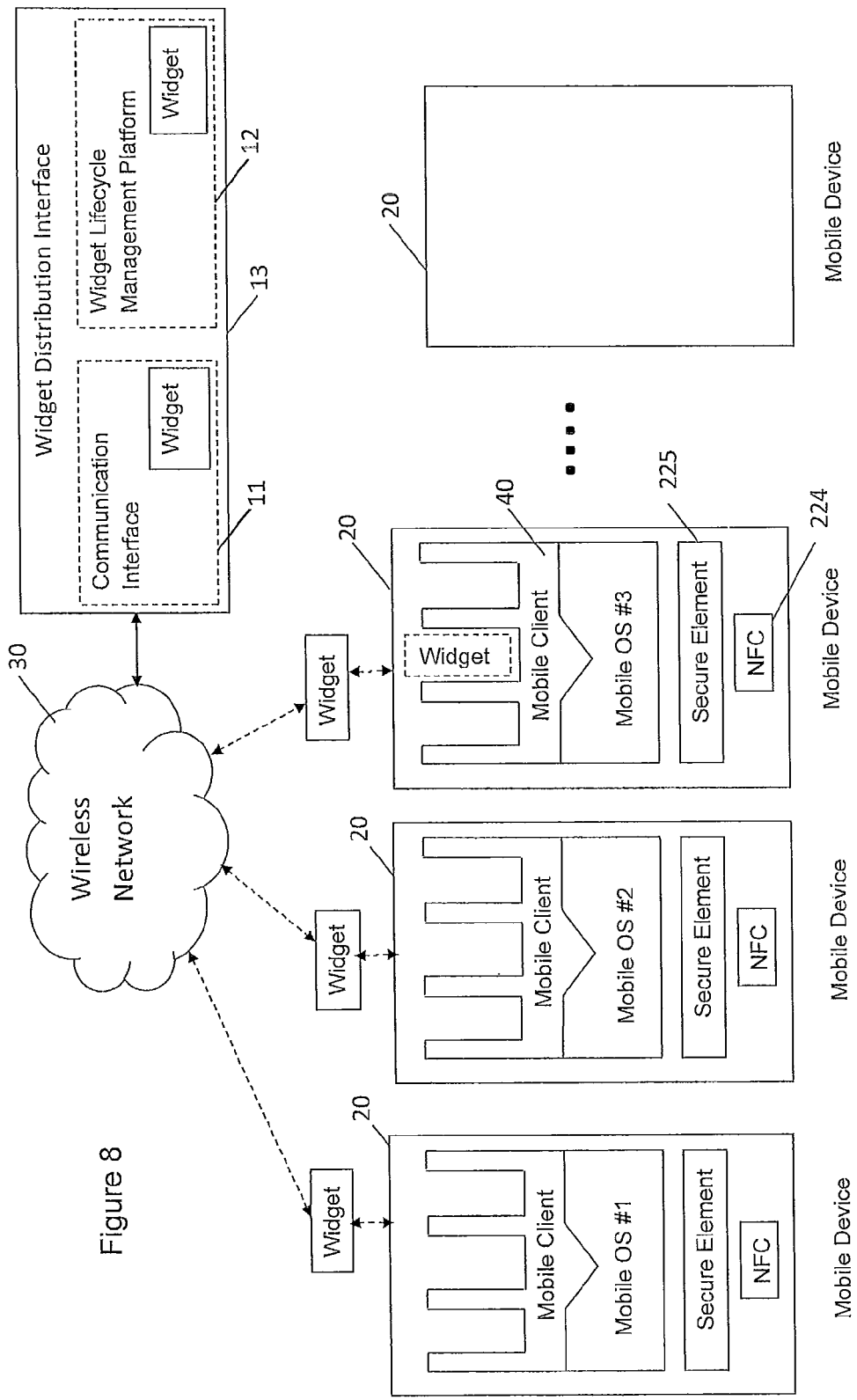
FIG. 8 shows a system architecture diagram of a mobile integrated distribution and transaction system for NFC services in accordance with embodiments of the present invention.

Turning now to FIG. 8, a system architecture diagram of a mobile integrated distribution and transaction system for NFC services is shown in accordance with a further embodiment of the present invention. The distribution and transaction system employs a front-end mobile platform for porting and distribution of NEC applications, and has a widget-based architecture, which enables fast application development of NFC services (e.g., proximity payment, transport, ticketing, loyalty cards, coupons, etc.). In some embodiments, the distribution and transaction system comprises a mobile client 40, which is generated or otherwise preconfigured, and distributed to a plurality of mobile electronic devices 20. The mobile client 40 is a runtime system that is configured to enable widgets that are delivered to the mobile electronic device 20 to be loaded and executed. The system further includes a widget distribution interface 13 operating on server 10, which can comprise the communication interface 11 and widget lifecycle management platform 12, both of which are described in detail above in the description of FIG. 1.

In some embodiments, widgets are developed using the widget generator (SDK) associated with the widget lifecycle management platform 12 as described above, and are distributed by the communication interface 11 over wireless network 30 to one or more mobile electronic devices 20, where they are executed on mobile client 40. Mobile client 40 is configured to be compatible with a plurality of mobile operating systems (OSs) employed on a plurality of mobile electronic devices from a plurality of manufacturers and/or service providers. Different OSs may have different interfaces and different OS-specific functions and/or requirements. Likewise, different mobile electronic devices have different hardware components, each having their own requirements. For example, accessing the NFC transceiver or the secure element (SE) requires different extensions, protocols and/or drivers depending on the particular OS and hardware of the mobile electronic device 20. As such, mobile client 40 is configured with a plurality of compatible extensions, protocols and/or drivers already integrated. This allows service providers, for example, the flexibility to design a single OS-independent and mobile electronic device-independent widget using the SDK for deployment on a plurality of different OSs and devices without requiring the creation of many varying iterations of the same widget to meet the requirements of each.

Figure 9:
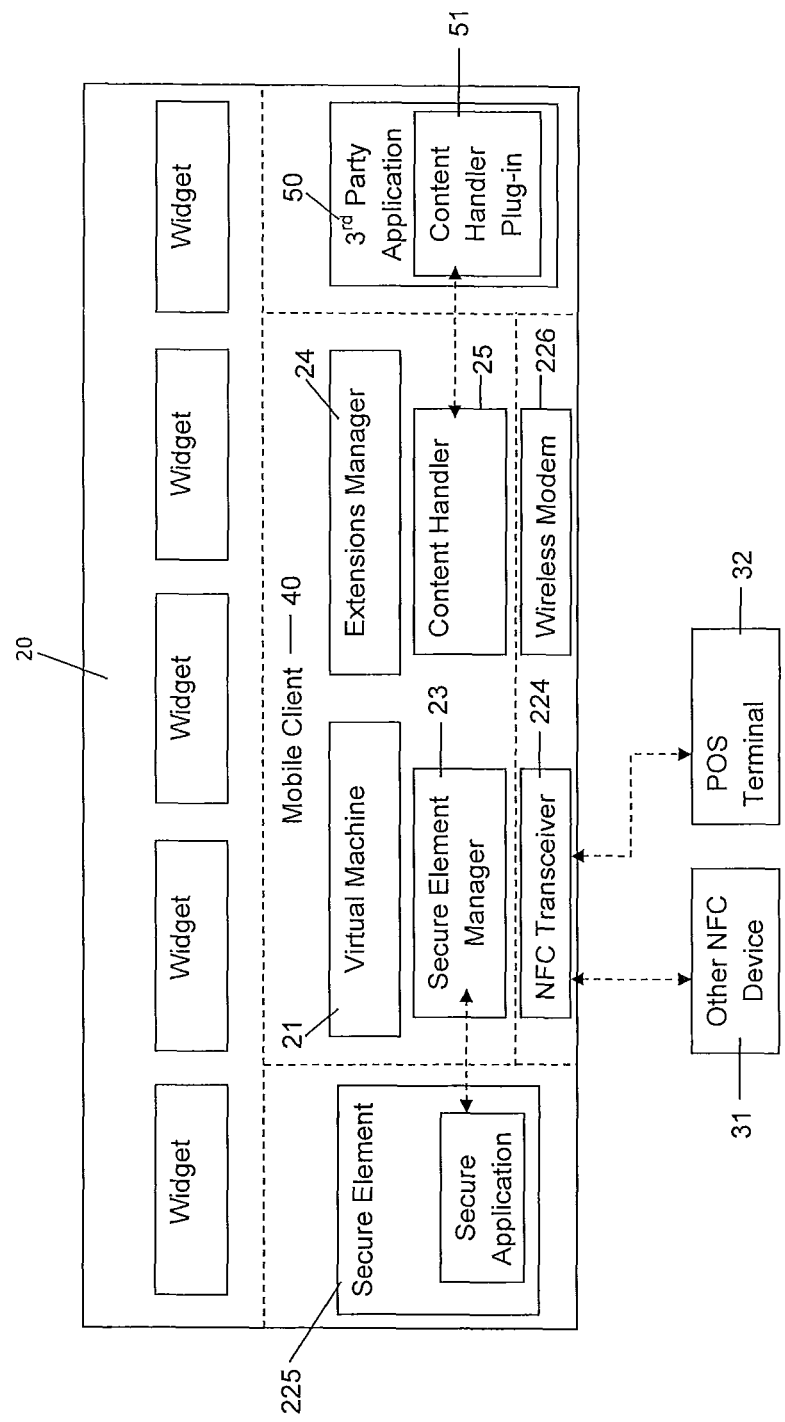
FIG. 9 shows a schematic block diagram illustrating elements of the software and the hardware of the mobile electronic device in accordance with embodiments of the present invention.

Turning to FIG. 9, in accordance with embodiments of the invention, mobile client 40 comprises virtual machine 21 (described in detail above), secure element (SE) manager 23, extensions manager 24, and content handler 25. It should be noted that in other embodiments, one or more of the above can be omitted. For example, mobile client 40 can be configured without extensions manager 24 and content handler 25, as those programs may not be required or can be provided separate from the mobile client 40. In some embodiments, virtual machine 21 is configured to provide a stack-based runtime environment for the widgets, requiring no registers. For each operation, the operands are pushed on top of the stack in the correct order, allowing the accumulation of operands to allow the sequential execution of operations during the life of the thread of code that manages the execution context. It will of course be understood by those of ordinary skill in the art that other implementations of virtual machine 21 can be used, such as a register-based environment.

The runtime environment, which is executed in the processor, implements the core behavior of the programming code when invoked by a widget. The virtual machine 21 can then implement an action on the mobile electronic device 20, such as, for example, causing a connection to a secure application in the SE. Additionally or alternatively, the virtual machine 21 can translate the invocation into an invocation of the particular OS of the mobile electronic device 20, such as for causing the OS of the mobile electronic device 20 to connect directly to the wireless network, etc.

The SE manager 23 is configured to enable a widget to read from and/or write to the SE, provided the widget certificate has been authenticated by the virtual machine 21. The SE manager 23 enables the authenticated widget to access a secure application stored in the SE, which in some embodiments enables an NFC transaction to be performed by the mobile electronic device 20. This can be accomplished by the SE manager 23 first abstracting all the heterogeneous interfaces for accessing the SE into a platform-independent interface used by the widget. While the SE manager 23 is capable of providing communication between a plurality of widgets and a plurality of SEs, it is typically configured to provide access to a single SE using a single channel at any given time. Therefore, concurrent connections are blocked until the thread owning the connection releases it. To connect a widget with a secure application in a SE, the SE manager 23 can create an instance of a configured driver by specifying the driver's class name from the previously abstracted information, enabling access to the SE using the driver. Furthermore, due to the platform-independent interface, SE manager 23 is configured to provide access to a plurality of SEs installed (or installable) on a variety of mobile electronic devices 20.

In accordance with embodiments of the invention, mobile client 40 can also include extensions manager 24. Extensions manager 24 is responsible for managing all the extensions present in mobile client 40, and for providing an interface between extensions and the mobile client 40. Extensions incorporated into mobile client 40, and managed by extensions manager 24 can include extensions common to a plurality of OS platforms (i.e. RIM, J2ME, Nokia, Android, etc.), and Application Protocol Data Unit (APDU) extensions. Extensions manager 24 can also manage OS-specific extensions. Extensions manager 24 provides communication between virtual machine 21 and SE manager 23, and the extensions. In some embodiments, extensions manager 24 can be updated as necessary via wireless network 30 to ensure compatibility, and/or specific extensions may be provided to the extensions manager 24 directly when a data connection is requested that is not initially supported by the extensions present in mobile client 40. In some embodiments, extensions manager 24 can access a library of extensions present on the OS of the mobile electronic device 20 in lieu of an extension in mobile client 40.

Mobile client 40 can also include content handler 25. Content handler 25 is configured to provide communication between native third-party applications (such as third-party application 50) installed on the mobile electronic device 20 and the widgets. Content handler 25 is also configured to provide communication between third-party applications and secure applications stored in the SE. In particular, content handler 25 is responsible for managing incoming connections from third-party applications attempting to connect to a widget or secure application, and outgoing connections to third-party applications. Furthermore, content handler 25 maintains a list of actions available for third-party applications that are allowed to connect to widgets and/or secure applications.

In some embodiments, managing connections and interactions between third-party application 50 and widgets/secure applications is accomplished by employing a content handler plug-in 51. Content handler plug-in 51 is a specific library that must be implemented in third-party application 50 in order to be able to communicate and interact with the mobile client 40 through the content handler 25. The content handler plug-in 51 can comprise several parameters including: a unified reference locator (URL) of the content handler 25 for connection with the content handler 25; a widget identifier associated with each widget with which the third-party application 50 would like to communicate; and/or the list of actions available to the third-party application 50 for interacting with the mobile client 40. In some embodiments, by employing the content handler plug-in 51, third party application 50 is configured with the identity of the widget and/or secure application (stored in the SE) with which it can interact. Only by calling the specific widget and/or secure application, will content handler 25 enable communication with widgets via virtual machine 21, and with secure applications via secure element manager 23.

In accordance with aspects that can be included in embodiments constructed in accordance with the invention, if a widget is called by third-party application 50, but the widget is not present in the memory of mobile electronic device 20, content handler 25 can initiate a download of the widget from the widget distribution interface 13 over wireless network 30 via wireless modem 226. Conversely, if third-party application 50 is called by a widget, but the third-party application 50 is not present in the memory of mobile electronic device 20, content handler 25 can initiate a download of the third-party application 50 from the source server of the third-party application developer over wireless network 30 via wireless modem 226. In either instance, notifications can be provided via the mobile electronic device to the user that additional resources are needed to implement an action that has commenced at the mobile electronic device 20. Optionally, such notifications can include a prompt to the user to accept having such resources downloaded to the mobile electronic device.

Employing content handler 25 and content handler plug-in 51, functionality of mobile client 40 is broadened in a manner that, among other things, simplifies the conduct of a variety of NFC transactions. For example, a widget can be accessed directly from third-party application 50 without a mobile device user having to close the third-party application 50 and open the mobile client 40 in order to complete an NFC transaction via NFC transceiver 224. Third-party application 50 may, for example, require information that can be provided directly from one or more widgets (e.g. club membership information from a club card widget, location data from a GPS enabled widget, and/or payment information from a payment widget) in order to complete an NFC transaction, but does not require the full functionality of the associated secure applications. As such, an NFC transaction can be initiated and concluded from within the third-party application 50 while maintaining the security and integrity of the secure element, by providing third-party application 50 with access to the secure application via content handler 25 and content handler plug-in 51. This is in lieu of suspending the third-party application 50 in order to open a mobile wallet, for instance. Similarly, third-party application 50 can be accessed directly by the widget without the user having to leave or close the mobile client 40.

Furthermore, depending on the rights of the third-party application 50, which can be managed by settings established in the mobile client 40, similar reciprocal user access/functionality can be employed between third-party application 50 and a secure application located in the SE as between the widgets and the third-party application 50. This can occur, for example, when a mobile device user employs third-party application 50 (e.g., of a retail store) to browse for a product or service, but desires to pay for the product or service via NFC transaction, using a secure application provided by a trusted payment provider (e.g., VISA). As such, an NFC transaction can be initiated and concluded from within the third-party application 50 while maintaining the security and integrity of the secure element, by providing third-party application 50 with access to the secure application via content handler 25 and content handler plug-in 51. Finally, data exchange is selectively enabled between widgets/secure applications and third-party applications using the content handler system. As such, mobile client 50 can provide for secure and seamless management of NFC transactions between mobile electronic device 20 and other NFC-enabled devices 31 and/or POS terminals 32, using NFC transceiver 224, regardless of whether the transaction was initiated via the widget, the secure application in the SE, or a third-party application.

Figure 10:
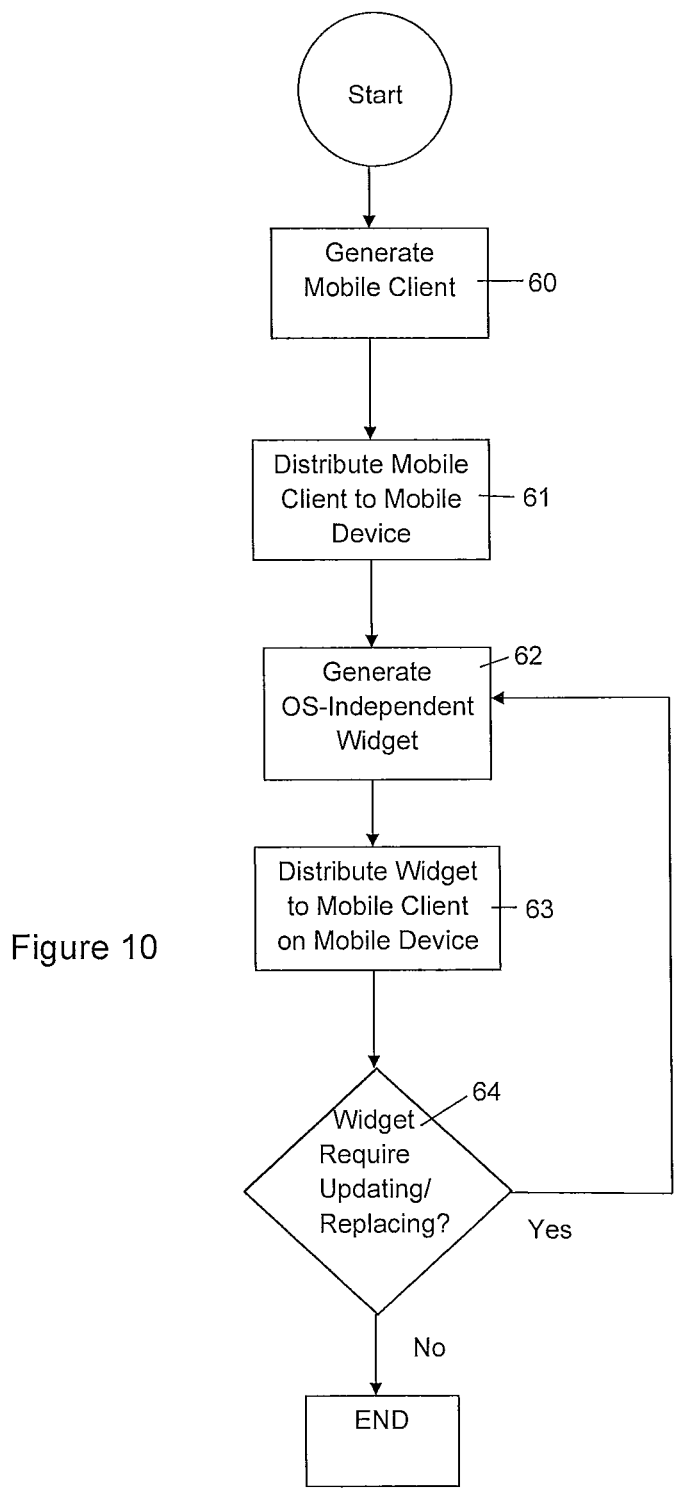
FIG. 10 is a flow chart showing a mobile distribution method in accordance with embodiments of the present invention.

Turning now to FIG. 10, a flow chart showing a mobile distribution method in accordance with certain embodiments of the present invention is provided. At step 60, mobile client 40 is generated and includes the plurality of OS-specific and hardware-specific information and requirements which are embedded into mobile client 40 before deployment on each of a plurality of mobile electronic devices 20. For instance, the mobile client can comprise code such as a set of instructions executable in a processor of the mobile electronic device 20 once deployed. At step 61, mobile client 40 is distributed to one or more mobile electronic devices 20 across the wireless network 30 in a conventional manner, or is otherwise installed on the mobile electronic device 20 (e.g., by the device manufacturer). At step 62, OS-independent widgets are developed (e.g., by service providers, mobile network operators, etc.) using the SDK of the widget distribution interface 13, and at step 63 the widgets are wirelessly distributed to the one or more mobile electronic devices 20 over wireless network 30, and provided to mobile client 40. At step 64, should the widget developer desire to update, change, or delete the widget and/or should the widget require an update, change, or deletion, the widget can be appropriately modified without modification of the mobile client 40. Otherwise, the widget continues to reside on the mobile electronic devices 20 throughout the widget's lifecycle, and the method ends.

At this juncture, it should be noted that although much of the foregoing description has been directed to mobile integrated distribution and transaction systems and methods for NFC services, the systems and methods disclosed herein can be similarly deployed and/or implemented in scenarios, situations, and settings far beyond the referenced scenarios. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for providing augmented content. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions describe herein can be implemented by hardware and or hardware executing code (also known as programs, software, or software applications) which include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A mobile distribution system, installed on a mobile electronic device having a processor, memory, and code in the memory for implementing a particular mobile operating system in the processor, and being operatively coupled to a secure element having one or more secure applications, the system comprising:
  a virtual machine configured to execute in the processor to provide a runtime environment capable of running a plurality of widgets and configured to enable the plurality of widgets to be operable on any of a plurality of mobile operating systems including the particular mobile operating system; and
  a secure element manager configured to enable at least one widget of the plurality of widgets to read from or write to the secure element by providing communication between the at least one widget and a corresponding one of the one or more secure applications stored in the secure element, and enabling the mobile electronic device to perform at least one NFC transaction using the corresponding one of the one or more secure applications;
    wherein the secure element manager is configured to connect the at least one widget with the secure element by creating an instance of a configured driver enabling access to the secure element in response to a request by the at least one widget to access the secure element; and
    wherein the secure element manager is configured to provide access to a plurality of secure elements.

2. The system of claim 1, further comprising:
  a content handler configured to provide at least one of the following:
    communication between a third-party application installed on the mobile electronic device and the at least one widget; and
    communication between the third-party application installed on the mobile electronic device and the corresponding one of the one or more secure applications stored in the secure element; and
  a content handler plug-in, the content handler plug-in being implemented in the third-party application, and enabling the third-party application to operatively communicate with the content handler.

3. The system of claim 2, the content-handler plug-in further comprising:
  a unified reference locator (URL) of the content handler for connection to the content handler; and
  at least one widget identifier associated with the at least one widget;
    wherein the at least one widget identifier is presented to the content handler via the URL to enable access by the third-party application to the at least one widget.

4. The system of claim 3, the virtual machine further configured to perform at least one of the following:
  initiate a download of the at least one widget from a widget distribution interface over a wireless network when the at least one widget identifier associated with the at least one widget is presented to the content handler by the third-party application, but the at least one widget is not presently installed on the mobile electronic device; and
  initiate a download of the third-party application from a third-party application distribution interface over the wireless network when the at least one widget attempts to communicate with the third-party application, but the third-party application is not presently installed on the mobile electronic device.

5. The system of claim 1, further comprising: an extensions manager configured using code executed in the processor to provide communication between at least one of the virtual machine and the secure element manager, and a plurality of extensions associated with the plurality of mobile operating systems.

6. The system of claim 1, wherein:
  each of the plurality of widgets is configured to be operable in the runtime environment, using code executing in the processor, without necessitating configuration directly with the plurality of mobile operating systems; and wherein
  each of the plurality of widgets can be added, removed, or updated without necessitating alteration of the runtime environment.

7. The system of claim 1, wherein:
  the plurality of widgets are configured for authentication by the virtual machine; and wherein
  the secure element manager is configured to provide the at least one widget with access to the corresponding one of the one or more secure applications in response to the authentication by the virtual machine.

8. The system of claim 1, wherein the at least one widget displays multimedia content associated with the corresponding one of the one or more secure applications.

9. The system of claim 1, wherein the secure element is divided into a plurality of secure domains, and each of the one or more secure applications is stored in a respective secure domain.

10. The system of claim 1, wherein the corresponding one of the one or more secure applications comprises at least one of a transport application, a credit/debit application, a coupon application, a secure access application, a loyalty card application, an electronic purse application, and a ticketing application.

11. The system of claim 1, wherein the at least one secure element comprises at least one of a secure SIM card, a secure memory card, and secure internal memory.

12. A method of providing a mobile distribution system, for use on a mobile electronic device having a processor, memory, and code in the memory for implementing a particular mobile operating system in the processor, and being operatively coupled to a secure element having one or more secure applications, the method comprising:
generating a mobile client for distribution over a wireless network to the mobile electronic device, the mobile client comprising at least the following:
a virtual machine configured to execute in the processor to provide a runtime environment capable of running a plurality of widgets and configured to enable the plurality of widgets to be operable on any of a plurality of mobile operating systems including the particular mobile operating system; and
a secure element manager configured to enable at least one widget of the plurality of widgets to read from or write to the secure element by providing communication between the at least one widget and a corresponding one of the one or more secure applications stored in the secure element, and enabling the mobile electronic device to perform at least one NFC transaction using the corresponding one of the one or more secure applications;
wherein the secure element manager is configured to connect the at least one widget with the secure element by creating an instance of a configured driver enabling accessing to the secure element in response to a request by the at least one widget to access the secure element; and
wherein the secure element manager is configured to provide access to a plurality of secure elements; and
distributing the mobile client to the mobile electronic device.

13. The method of claim 12, the mobile client further comprising:
a content handler configured to provide at least one of the following:
communication between a third-party application installed on the mobile electronic device and the at least one widget; and
communication between the third-party application installed on the mobile electronic device and the corresponding one of the one or more secure applications stored in the secure element; and
a content handler plug-in, the content handler plug-in being implemented in the third-party application, and enabling the third-party application to operatively communicate with the content handler.

14. The method of claim 13 the content-handler plug-in further comprising:
a unified reference locator (URL) of the content handler for connection to the content handler; and
at least one widget identifier associated with the at least one widget;
wherein the at least one widget identifier is presented to the content handler via the URL to enable access by the third-party application to the at least one widget.

15. The method of claim 14, further comprising:
initiating a download of the at least one widget from a widget distribution interface over the wireless network when the at least one widget identifier associated with the at least one widget is presented to the content handler by the third-party application, but the at least one widget is not presently installed on the mobile electronic device; and
initiating a download of the third-party application from a third-party application distribution interface over the wireless network when the at least one widget attempts to communicate with the third-party application, but the third-party application is not presently installed on the mobile electronic device.

16. The method of claim 12, the mobile client further comprising: an extensions manager configured using code executed in the processor to provide communication between at least one of the virtual machine and the secure element manager, and a plurality of extensions associated with the plurality of mobile operating systems.

17. The method of claim 12, further comprising:
generating the plurality of widgets, each of the plurality of widgets configured to be operable in the runtime environment, using code executing in the processor, without necessitating configuration directly with the plurality of mobile operating systems, and each of the plurality of widgets configured to be added, removed, or updated without necessitating alteration of the runtime environment; and
distributing the plurality of widgets to the mobile electronic device over the wireless network.

18. The method of claim 12, wherein:
the plurality of widgets are configured for authentication by the virtual machine; and wherein
the secure element manager is configured to provide the at least one widget with access to the corresponding one of the one or more secure applications in response to the authentication by the virtual machine.

19. The method of claim 12, wherein the at least one widget displays multimedia content associated with the corresponding one of the one or more secure applications.

20. The method of claim 12, wherein the secure element is divided into a plurality of secure domains, and each of the one or more secure applications is stored in a respective secure domain.

21. The method of claim 12, wherein the corresponding one of the secure applications comprises at least one of a transport application, a credit/debit application, a coupon application, a secure access application, a loyalty card application, an electronic purse application, and a ticketing application.

22. The method of claim 12, wherein the at least one secure element comprises at least one of a secure SIM card, a secure memory card, and secure internal memory.

* * * * *